Jan. 17, 1933.  C. H. RESCH  1,894,572
DEMOUNTABLE RIM FOR WIRE WHEELS
Filed Nov. 17, 1930

Charles H. Resch  INVENTOR

BY Victor J. Evans
ATTORNEY

Patented Jan. 17, 1933

1,894,572

UNITED STATES PATENT OFFICE

CHARLES H. RESCH, OF AKRON, OHIO

DEMOUNTABLE RIM FOR WIRE WHEELS

Application filed November 17, 1930. Serial No. 496,246.

This invention relates to certain new and useful improvements in wheel structures and more particularly to a demountable rim for wire wheels.

One of the principal objects of the invention consists of a sectional rim structure formed between the rim and wheel structure.

More specifically stated the demountable portion of the rim structure is provided with a seat to support the beads of a tire casing in positions spaced from the drop center of the wheel.

With the above and other objects in view, the invention further consists of the following novel features and details of construction, to be hereinafter more fully described, illustrated in the accompanying drawing and pointed out in the appended claim.

In the drawing:—

Figure 1:
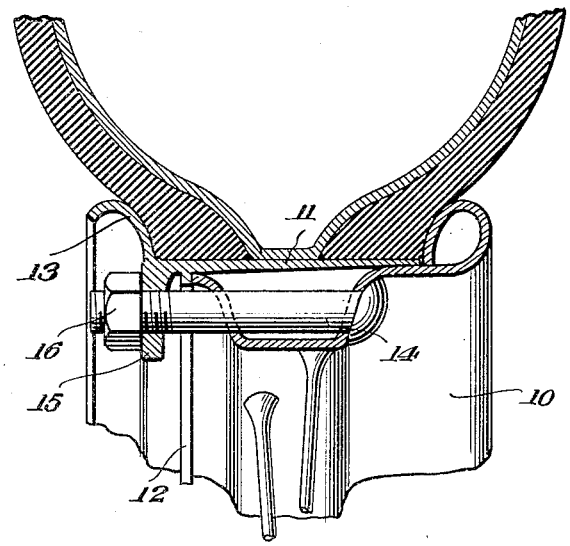
Figure 1 is a horizontal sectional view taken through the present invention showing the tire casing applied for active use.
Figure 2:
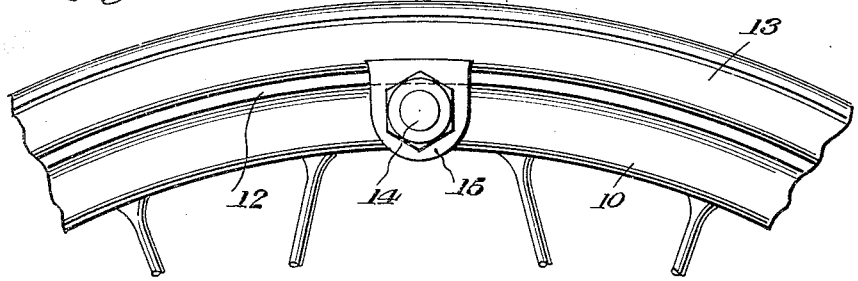
Figure 2 is a fragmentary side elevation of the invention.

Referring to the drawing in detail wherein like characters of reference denote corresponding parts, the reference character 10 indicates generally a conventional form of motor vehicle drop center wire wheel having the bead upon the outer side edge thereof removed for purposes to be better understood in the following description of the invention.

Instead of incumbering the driver of a wire wheel equipped vehicle with the bodily removal and lifting of wire wheels in their entirety, it is my intention to incorporate a form of demountable rim section for the wheel structure whereby only the latter and the tire thereon are to be removed and lifted to alleviate the foregoing laborious work of tire changing.

In accomplishing this end, I provide an annular rim section 11 extending over and across the drop center of the wheel structure to provide a seat for the beads of a tire casing and to hold the latter without the drop center. The innermost side edge of the rim section 11 is designed for abutting engagement with the inner side of the solitary bead upon the wheel structure and the outer edge of the wheel structure abuts an annular shoulder 12 whereby independent lateral motion between the wheel structure and rim section will be prevented. A bead or flange 13 is formed upon the outer edge of the rim section 11 for engagement with the side of the tire casing adjacent the bead therefor. Bolt members 14 are passed transversely through the walls of the drop center portion of the wheel structure and apertured ears 15 arranged at corresponding intervals upon the inner circumference of the rim section 11. The usual nuts or other locks, such as indicated at 16, are then applied to the outermost projecting threaded ends of the bolt members 14 to lockingly retain the wheel structure and rim section against displacement.

Figure 3:
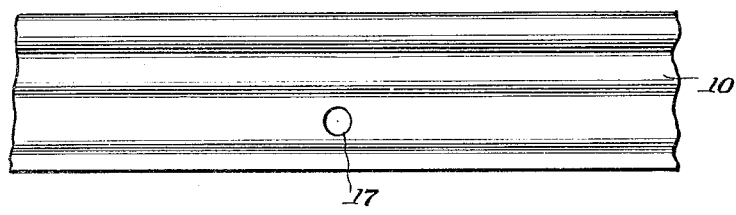
Figures 3 and 4 are fragmentary top plan views of the wheel structure and demountable rim illustrative of the particular manner of assembly.
Figure 4:
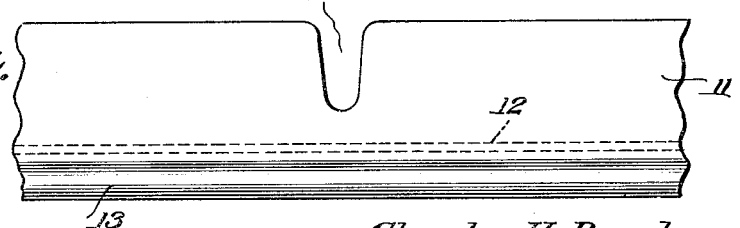

From the fragmentary top plan views of the wheel structure and rim section in Figures 3 and 4 of the drawing, it is understood that the wheel structure is provided with a valve stem receiving opening 17 and the rim section has incorporated a slot 18 opening from the inner peripheral edge thereof to facilitate accommodation of the valve stem from the side as the tire and tube is pushed or otherwise applied upon the rim section. It is to be noted from the foregoing that sufficient lateral surface is provided upon the rim section to accommodate the tire and tube without subjecting the latter to pinching or other difficulties experienced in the conventional drop center forms of wire wheels.

The invention is susceptible of various changes in its form, proportions and minor details of construction and the right is herein reserved to make such changes as properly fall within the scope of the appended claim.

Having described the invention, what is claimed is:

In combination with a wheel felly having a drop center and a fixed flange provided with an annular bead at one edge, a bolt disposed across the drop center of the felly, a removable side flange fitting snugly upon the felly and adapted to support a tire, said side flange having an edge bearing against the side of said bead, said side flange being tapered by gradually increasing in transverse thickness from said bearing edge toward its opposite edge and said tapered portion bridging the drop center of the felly, a lug carried at the thicker portion of the side flange and receiving said bolt and said side flange having an annular bead spaced from the inner side of said lug and bearing against the edge of the drop center portion of the felly.

In testimony whereof I affix my signature.

CHARLES H. RESCH.